United States Patent
Kapadia et al.

(10) Patent No.: US 9,582,555 B2
(45) Date of Patent: Feb. 28, 2017

(54) DATA ENRICHMENT USING BUSINESS COMPENDIUM

(75) Inventors: Vishal Kapadia, Suwanee, GA (US); John Jensen, Madison, CT (US); Geralyn McBride, Vergennes, VT (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/605,523

(22) Filed: Sep. 6, 2012

(65) Prior Publication Data
US 2014/0067803 A1 Mar. 6, 2014

(51) Int. Cl.
*G06F 17/30* (2006.01)
(52) U.S. Cl.
CPC ... *G06F 17/30563* (2013.01); *G06F 17/30011* (2013.01); *G06F 17/30303* (2013.01); *G06F 17/3061* (2013.01); *G06F 17/30073* (2013.01); *G06F 17/30286* (2013.01); *G06F 17/30489* (2013.01); *G06F 17/30985* (2013.01)
(58) Field of Classification Search
CPC ............ G06F 17/30011; G06F 17/3061; G06F 17/30073; G06F 17/30286; G06F 17/30303; G06F 17/30489; G06F 17/30985; G06F 17/30306; G06F 17/30312
USPC ........ 707/600, 602, 706, 692, 610, 754, 769
See application file for complete search history.

(56) References Cited

U.S. PATENT DOCUMENTS

| | | | |
|---|---|---|---|
| 5,659,731 A * | 8/1997 | Gustafson | |
| 6,778,979 B2 * | 8/2004 | Grefenstette | G06F 17/30643 |
| 6,928,425 B2 * | 8/2005 | Grefenstette | G06F 17/30011 707/754 |
| 7,254,581 B2 * | 8/2007 | Johnson | G06Q 30/06 707/627 |
| 7,313,575 B2 * | 12/2007 | Carr | G06Q 10/10 |
| 7,376,680 B1 * | 5/2008 | Kettler et al. | |
| 7,392,240 B2 * | 6/2008 | Scriffignano et al. | |

(Continued)

OTHER PUBLICATIONS

Norckauer, H.R., Duplicate Entry Detection in Mailing and Participation Lists, May 1990, WP#CIS-90-16, pp. 1-52.*

(Continued)

*Primary Examiner* — Frantz Coby
(74) *Attorney, Agent, or Firm* — Fountainhead Law Group P.C.

(57) ABSTRACT

Embodiments relate to enrichment of a data warehouse utilizing a business compendium. Embodiments may employ a process comprising data standardization and cleansing, de-duplication of entries, and matching and enrichment, followed by manual review of an enriched record by a user. During standardization, data may be transformed into consistent content, placing correct data elements into appropriate fields, removing invalid characters, and/or standardizing names and addresses. Duplicate records are then detected and marked. During matching and enrichment, the existence of an entity (such as a supplier), may be verified by progressive matching against the business compendium. Enrichment may provide additional information regarding the entity (e.g. related to risk, diversity, and bankruptcy). The enriched record is available for manual review, allowing the user to change duplicates, matches, and parent/child linkages. Feedback from the user review may enhance accuracy of subsequent enrichment by self-learning aspects, reducing over time a need for manual review.

8 Claims, 27 Drawing Sheets

(56) References Cited

U.S. PATENT DOCUMENTS

| | | | |
|---|---|---|---|
| 7,571,191 B2* | 8/2009 | Dill et al. | |
| 7,854,376 B2* | 12/2010 | Oberoi | G06F 17/30371 235/375 |
| 7,882,088 B2* | 2/2011 | Veit | 707/703 |
| 7,887,209 B2* | 2/2011 | Ishino et al. | 362/97.3 |
| 7,987,123 B1* | 7/2011 | Gaffney et al. | 705/34 |
| 7,991,661 B1* | 8/2011 | Gaffney et al. | 705/34 |
| 8,065,300 B2* | 11/2011 | Gupta | G06F 17/30864 707/730 |
| 8,219,523 B2* | 7/2012 | Ben Harush | G06F 17/30306 707/610 |
| 8,290,951 B1* | 10/2012 | Joa et al. | 707/736 |
| 8,356,037 B2* | 1/2013 | Basu | G06Q 30/02 705/14.4 |
| 8,510,276 B2* | 8/2013 | Haiby | G06F 17/30303 707/692 |
| 8,538,934 B2* | 9/2013 | Hudis | G06F 17/30312 707/692 |
| 8,620,806 B2* | 12/2013 | Prada Peyser | G06Q 20/20 705/39 |
| 8,682,866 B1* | 3/2014 | McDill et al. | 707/692 |
| 8,706,692 B1* | 4/2014 | Luthra | G06F 17/30575 707/622 |
| 8,768,802 B2* | 7/2014 | Engle | G06Q 40/123 705/35 |
| 8,799,060 B2* | 8/2014 | Gillenson | G06Q 30/0222 705/14.1 |
| 8,930,237 B2* | 1/2015 | Gupta | G06F 17/30864 705/14.4 |
| 8,996,479 B2* | 3/2015 | Haiby | G06F 17/30303 707/692 |
| 2002/0035555 A1* | 3/2002 | Wheeler et al. | 707/1 |
| 2002/0072927 A1* | 6/2002 | Phelan et al. | 705/1 |
| 2003/0097359 A1* | 5/2003 | Ruediger | 707/6 |
| 2004/0107386 A1* | 6/2004 | Burdick et al. | 714/38 |
| 2004/0148278 A1* | 7/2004 | Milo et al. | 707/3 |
| 2004/0210763 A1* | 10/2004 | Jonas | 713/193 |
| 2004/0215656 A1* | 10/2004 | Dill et al. | 707/103 R |
| 2004/0220918 A1* | 11/2004 | Scriffignano et al. | 707/3 |
| 2005/0060324 A1* | 3/2005 | Johnson | G06Q 30/06 |
| 2005/0234913 A1* | 10/2005 | Carone et al. | 707/9 |
| 2005/0278270 A1* | 12/2005 | Carr | G06Q 10/10 706/25 |
| 2006/0004595 A1* | 1/2006 | Rowland | G06Q 10/06 705/1.1 |
| 2006/0238919 A1* | 10/2006 | Bradley | G06F 17/30303 360/128 |
| 2009/0019434 A1* | 1/2009 | Gosain | 717/174 |
| 2009/0234826 A1* | 9/2009 | Bidlack | 707/5 |
| 2009/0326983 A1* | 12/2009 | Kunz | 705/3 |
| 2011/0137928 A1* | 6/2011 | Engle | G06Q 40/123 707/769 |
| 2011/0184827 A1* | 7/2011 | Hubert | G06F 17/30011 705/26.1 |
| 2012/0010998 A1* | 1/2012 | Spreen | G06Q 30/02 705/14.54 |
| 2012/0047179 A1* | 2/2012 | Faruquie et al. | 707/797 |
| 2012/0278349 A1* | 11/2012 | Bidlack | 707/758 |
| 2013/0124392 A1* | 5/2013 | Achanta et al. | 705/38 |
| 2013/0268479 A1* | 10/2013 | Andler et al. | 707/602 |

OTHER PUBLICATIONS

Declaration of Vishal Kapadia, dated Oct. 14, 2014.
Document entitled "Spend Classification", Version 7.0, pp. 1-48, dated Oct. 28, 2009.

* cited by examiner

| CUSTOMER MASTER DATA-INPUT | | | | | | | |
|---|---|---|---|---|---|---|---|
| ID | NAME1 | NAME2 | ADD1 | ADD2 | CITY | REG | CNTRY | POSTAL |
| I-772412 | Comp B | Suppl 1 | | FULTON | ATLANTA | | US | 30353-3202 |
| I-772416 | Comp C | Suppl 2 | 314 WEST INSTIT | DUPAGE | CHICAGO | | US | 60610 |
| I-772417 | Comp D | Suppl 3 | 135 EAST 57TH ST | NEW YORK | | | US | 10022 |
| I-772418 | Comp D | Suppl 3 | 135 EAST 57TH ST | | NEW YORK | | US | 10022 |
| I-772419 | Comp A | Suppl 4 | FILE 51141 | LOS ANGE | LOS ANGE | | US | 90074-1141 |
| I-772422 | Comp D | Suppl 3 | 135 EAST 57TH ST | NEW YORK | NEW YORK | | US | 10022 |

FIG. 2A

| CUSTOMER MASTER DATA-AFTER CLEANSING |||||
|---|---|---|---|---|
| ID | NAME1 | NAME2 | ADD1 | ADD2 | CITY |
| I-772412 | Comp B | Suppl | Fulton | | Atlanta |
| I-772416 | Comp C | 1Suppl | 314 West Institute | Dupage | Chicago |
| I-772417 | Comp D | 2Suppl | 135 E 57th St Fl 9TH | | New York |
| I-772418 | Comp D | 3Suppl | 135 E 57th St Fl 9TH | | New York |
| I-772419 | Comp A | 3Suppl | File 51141 | Los Angeles | Los Angeles |
| I-772422 | Comp D | 4Suppl 3 | 135 E 57th St Fl 9TH | | New York |

FIG. 2B

| CUSTOMER MASTER DATA -AFTER DE-DUPLICATION ||||||
|---|---|---|---|---|---|
| ID | DUPL_ID | NAME1 | NAME2 | ADD1 | ADD2 |
| I-772412 | I-772412 | Comp B | Suppl | Fulton | |
| I-772416 | I-772416 | Comp C | 1Suppl | 314 West Institute | Dupage |
| I-772417 | I-772417 | Comp D | 2Suppl | 135 E 57th St Fl 9TH | |
| I-772418 | I-772417 | Comp D | 3Suppl | 135 E 57th St Fl 9TH | |
| I-772419 | I-772419 | Comp A | 3Suppl | File 51141 | Los Angeles |
| I-772422 | I-772417 | Comp D | 4Suppl 3 | 135 E 57th St Fl 9TH | |

FIG. 2C

| REG | COUNTRY | POSTAL | ISOCNTRY | ISO31662 |
|---|---|---|---|---|
| GeorgiaIll | United States | 30353-3202 | US | US-GA |
| inoisNew | United States | 60610-3043 | US | US-IL |
| YorkNew | United States | 10022-2050 | US | US-NY |
| YorkCalif | United States | 10022-2050 | US | US-NY |
| orniaNew | United States | 90074-1141 | US | US-CA |
| York | United States | 10022-2050 | US | US-NY |

FIG. 2B (Cont.)

| CITY | REG | COUNTRY | POSTAL | ISOCNTRY | ISO31662 |
|---|---|---|---|---|---|
| AtlantaChic | GeorgiaIlli | United States | 30353-3202 | US | US-GA |
| agoNew | noisNew | United States | 60610-3043 | US | US-IL |
| YorkNew | YorkNew | United States | 10022-2050 | US | US-NY |
| YorkLos | YorkCalif | United States | 10022-2050 | US | US-NY |
| AngelesNe | orniaNew | United States | 90074-1141 | US | US-CA |
| w York | York | United States | 10022-2050 | US | US-NY |

FIG. 2C (Cont.)

| | ID | PARENT_ID | DUPL_ID | NAME1 | NAME2 | ADD1 |
|---|---|---|---|---|---|---|
| Hierarchy information for record I-772412 | I-772412 | E-51 | I-772412 | Comp B | Suppl | Fulton |
| | E-51 | E-52 | | Comp B | 1Suppl | 195 Broadway |
| | E-52 | E-47 | | Comp E | 1Suppl | 195 Broadway |
| | E-47 | E-47 | | Comp F | 1Suppl | 437 Madison Ave |
| Hierarchy information for record I-772417 | I-772416 | E-68 | I-772416 | Comp C | 2Suppl | 314 W Institute Pl Fl 3W |
| | E-68 | E-68 | | Comp G | 2Suppl | 314 W Institute Pl |
| Hierarchy information for record I-772417, I-772418, I-772419 | E-68 | E-70 | I-772417 | Comp D | 3Suppl | 135 E 57th St Fl 9TH |
| | E-70 | E-70 | | Comp H | 3Suppl | 135 E 57th St Rear |
| | I-772418 | I-772418 | I-772417 | Comp D | 3Suppl | 135 E 57th St Fl 9TH |
| | I-772422 | I-772422 | I-772417 | Comp D | 3Suppl | 135 E 57th St Fl 9TH |
| Hierarchy information for record I-772419 | I-772419 | E-31 | I-772419 | Comp A | 4Suppl | File 51141 |
| | E-31 | E-99 | | Comp A | 4Suppl | |
| | E-99 | E-41 | | Comp A | 5Suppl | |
| | E-41 | E-55 | | Comp A | 4Suppl | 2765 Loker Ave W |
| | E-55 | E-49 | | Comp I | 4Suppl | 5545 Fermi Ct |
| | E-49 | E-19 | | Comp J | 4Suppl 4 | 5055 N Greeley Ave |
| | E-19 | E-19 | | Comp J | | Hoogoorddreef 9A |
| | E-19 | | | Comp K | | Adi-Dassler-Str 1 |

FIG. 2D

| CUSTOMER MASTER DATA AFTER ENRICHMENT ||||||||||
|---|---|---|---|---|---|---|---|---|---|
| ADD2 | CITY | REG | COUNTRY | POSTAL | ISOCNTRY | ISO31662 | PHONE | FAX |
| | Atlanta | Georgia | United States | 30353-3202 | US | US-GA | 2125907100 | 2125907100 |
| | New York | New York | United States | 10007-3100 | US | US-NY | 2125907100 | 2125907100 |
| | New York | New York | United States | 10007-3100 | US | US-NY | 2124153700 | 2124153700 |
| | New York | New York | United States | 10022-7000 | US | US-NY | 2124153600 | 2124153530 |
| Dupage | Chicago | Illinois | United States | 60610-3043 | US | US-IL | 3125878489 | 3125878489 |
| | Chicago | Illinois | United States | 60610-7585 | US | US-IL | 3125878489 | 3125878489 |
| | New York | NewYork | United States | 10022-2050 | US | US-NY | 2129012400 | 2126442947 |
| | New York | New York | United States | 10022-2133 | US | US-NY | 2129012400 | 2126442947 |
| | New York | New York | United States | 10022-2050 | US | US-NY | 2129012400 | 2126442947 |
| | New York | New York | United States | 10022-2050 | US | US-NY | 2129012400 | 2126442947 |
| Los Angeles | Los Angeles | California | United States | 90074-1141 | US | US-CA | 9132840 | 9132840 |
| | Los Angeles | California | United States | 90074 | US | US-CA | 9132840 | 9132840 |
| | Carlsbad | California | United States | 92010-6601 | US | US-CA | 7604386610 | 7604386610 |
| | Carlsbad | California | United States | 92008-7324 | US | US-CA | 7609311991 | 7609186008 |
| | Portland | Oregon | United States | 97217-3524 | US | US-OR | 9712342300 | 9712342300 |
| | Amsterdam Zuidoost | Noord-Holland | Netherlands | 1101 BA | NL | NL-NH | 625458119 | 205734586 |
| | Herzogenaurach | Bayern | Germany | 91074 | DE | DE-BY | 9132840 | 9132842241 |

FIG. 2D (Cont. 1)

| ADDITIONAL INFORMATION FROM COMPENDIUM ||||||||||
| TIN | LOBDESC(SIC8) | ISOLVL | MINOR | VETE | WMND | SMLBUS | OFAC_PROG | R_IN1 | R_IN2 | R_IN3 |
|---|---|---|---|---|---|---|---|---|---|---|
| 134117630 | Advertising agencies (73110000) | | Y | Y | | Y | BELARUS | 2 | 2 | 2 |
| 134117630 | Advertising agencies (73110000) | | Y | Y | | Y | BELARUS | 2 | 2 | 2 |
| 134117631 | Advertising agencies (73110000) | 9001 | | Y | | Y | SDNT | 5 | 1 | 2 |
| 131514814 | Advertising agencies (73110000) | 9001 | Y | | Y | | DARFUR | 5 | 1 | 2 |
| 131514816 | Men's and boys' sports (23290100) | 9001 | Y | Y | | Y | COTED | 4 | 1 | 1 |
| 131514816 | Men's and boys' sports (23290100) | 9001 | Y | Y | | Y | COTED | 4 | 1 | 1 |
| 131514818 | Business management (87429902) | 9001 | Y | | | Y | IRAN | 5 | 1 | 2 |
| 131514818 | Business management (87429902) | 9001 | Y | | | Y | IRAN | 5 | 1 | 2 |
| 131514818 | Business management (87429902) | 9001 | Y | | | Y | IRAN | 5 | 1 | 2 |
| 841052000 | P.O. Box for general (99998888) | 9001 | | | | Y | SDGT] [SDT | 4 | 1 | 1 |
| 841052000 | P.O. Box for general (99998888) | 9001 | | | | Y | SDGT] [SDT | 4 | 1 | 1 |
| 841052000 | Men's and boys' sports (23290100) | | Y | Y | | | IRGC] [NPWMD | 4 | 1 | 1 |
| 330831814 | Shafts, golf club (39490105) | 9001 | Y | Y | | Y | IRAQ2 | 2 | 2 | 2 |
| 330831815 | Athletic clothing(39490105) | 9001 | Y | | Y | Y | FTO][SDGT] [SDNTK | 5 | 1 | 2 |
| 330831816 | Market analysis(87320105) | 9001 | Y | | Y | Y | SDGT | 5 | 1 | 2 |
| 330831817 | Athletic shoes(31499901) | 9001 | Y | | | Y | ZIMB | 5 | 1 | 2 |

FIG. 2D (Cont. 2)

| | ID | PRNT_ID | DUPL_ID | NAME1 | NAME2 | ADD1 |
|---|---|---|---|---|---|---|
| Hierarchy Information for record I-772412 (After Rejecting Match) | I-772412 | E-51 | | Comp B | Suppl 1 | Fulton |
| | E-51 | E-52 | | Comp B | Suppl 1 | 195 Broadway |
| | E-52 | E-47 | | Comp E | Suppl 1 | 195 Broadway |
| | E-47 | E-47 | | Comp F | Suppl 1 | 437 Madison Ave |
| | I-772416 | E-68 →<br>E-52 | | | | 314 W Institute Pl Fl 3W |
| Hierarchy Information for record I-772417, I-772418, I-772419 | I-772417 | E-70 | | Comp G | Suppl 2 | 135 E 57th St Fl 9TH |
| | E-70 | E-70 | | Comp D | Suppl 3 | 135 E 57th St Rear |
| | I-772418 | I-772418 | | Comp H | Suppl 3 | 135 E 57th St Fl 9TH |
| | I-772422 | I-772422 | | Comp D | Suppl 3 | 135 E 57th St Fl 9TH |
| | I-772419 | E-31 | | Comp D | Suppl 3 | File 51141 |
| Hierarchy Information for record I-772419(After changing hierarchy) | E-31 | E-99 | | Comp A | Suppl 4 | |
| | E-99 | E-41 →<br>E-55 | | Comp A | Suppl 4 | 2765 Loker Ave W |
| | E-55 | E-49 | | Comp J | Suppl 5 | 5055 N Greeley Ave |
| | E-49 | E-19 | | Comp P | Suppl 4 | Hoogoorddreef 9A |
| | E-19 | E-19 | | Comp K | Suppl 4 | Adi-Dassler-Str 1 |

FIG. 2F

| CUSTOMER MASTER DATA AFTER ENRICHMENT | | | | | | | | |
|---|---|---|---|---|---|---|---|---|
| ADD2 | CITY | REG | CNTRY | POSTAL | ISOCNTRY | ISO31662 | PHONE | FAX |
| | Atlanta | Georgia | United States | 30353-3202 | US | US-GA | 2125907100 | 2125907100 |
| | New York | New York | United States | 10007-3100 | US | US-NY | 2125907100 | 2125907100 |
| | New York | New York | United States | 10007-3100 | US | US-NY | 2124153700 | 2124153700 |
| | New York | New York | United States | 10022-7000 | US | US-NY | 2124153600 | 2124153530 |
| Dupage | Chicago | Illinois | United States | 60610-3043 | US | US-IL | 3125878489 | 3125878489 |
| | New York | NewYork | United States | 10022-2050 | US | US-NY | 2129012400 | 2126442947 |
| | New York | New York | United States | 10022-2133 | US | US-NY | 2129012400 | 2126442947 |
| | New York | New York | United States | 10022-2050 | US | US-NY | 2129012400 | 2126442947 |
| | New York | New York | United States | 10022-2050 | US | US-NY | 2129012400 | 2126442947 |
| Los Angeles | Los Angeles | California | United States | 90074-1141 | US | US-CA | 9132840 | 9132840 |
| | Los Angeles | California | United States | 90074 | US | US-CA | 9132840 | 9132840 |
| | Carlsbad | California | United States | 92010-6601 | US | US-CA | 7604386610 | 7604386610 |
| | Portland | Oregon | United States | 97217-3524 | US | US-OR | 9712342300 | 9712342300 |
| | Amsterdam Zuidoost | Noord-Holland | Netherlands | 1101 BA | NL | NL-NH | 625458119 | 205734586 |
| | Herzogenaurach | Bayern | Germany | 91074 | DE | DE-BY | 9132840 | 9132842241 |

FIG. 2F (Cont. 1)

| ADDITIONAL INFORMATION FROM COMPENDIUM | | | | | | | | | | |
|---|---|---|---|---|---|---|---|---|---|---|
| TIN | LOBDESC(SIC8) | ISOLVL | MINOR | VETE | WMND | SMLBUS | OFAC_PROG | R_IN1 | R_IN2 | R_IN3 |
| 134117630 | Advertising agencies (73110000) | | Y | Y | | Y | BELARUS | 2 | 2 | 2 |
| 134117630 | Advertising agencies (73110000) | | Y | Y | | Y | BELARUS | 2 | 2 | 2 |
| 134117631 | Advertising agencies (73110000) | 9001 | | Y | | Y | SDNT | 5 | 1 | 2 |
| 131514814 | Advertising agencies (73110000) | 9001 | Y | | Y | | DARFUR | 5 | 1 | 2 |
| 131514816 | Men's and boys' sports (23290100) | 9001 | Y | Y | | Y | COTED | 4 | 1 | 1 |
| 131514818 | Business management (87429902) | 9001 | Y | | | Y | IRAN | 5 | 1 | 2 |
| 131514818 | Business management (87429902) | 9001 | Y | | | Y | IRAN | 5 | 1 | 2 |
| 131514818 | Business management (87429902) | 9001 | Y | | | Y | IRAN | 5 | 1 | 2 |
| 841052000 | P.O. Box for general (99998888) | 9001 | | | | Y | SDGT] [SDT | 4 | 1 | 1 |
| 841052000 | P.O. Box for general (99998888) | 9001 | | | | Y | SDGT] [SDT | 4 | 1 | 1 |
| 841052000 | Men's and boys' sports (23290100) | 9001 | Y | Y | | | IRGC] [NPWMD | 4 | 1 | 1 |
| 330831815 | Athletic clothing(39490105) | 9001 | Y | | Y | Y | FTO] [SDGT] [SDNTK | 5 | 1 | 2 |
| 330831816 | Market analysis(87320105) | 9001 | Y | | Y | Y | SDGT | 5 | 1 | 2 |
| 330831817 | Athletic shoes(31499901) | 9001 | Y | Y | | Y | ZIMB | 5 | 1 | 2 |

FIG. 2F (Cont. 2)

| Supplier | Validated | Legal Ownership | Industry | Spend |
|---|---|---|---|---|
| Grafix<br>Parc Industrial,<br>St. Marie QC | GraphCorr LLG(Grafix)<br>433 2ndAve, Sainte-Marie<br>QC G6E 3C6 CA | RockTenn<br>Company | Packaging | $75,000 |
| Smurfit<br>PO Box 93095,<br>Chicago, 60673 | Smurfit-Stone<br>Container Corp<br>150 N Michigan Ave,<br>Chicago, IL 60673 US | RockTenn<br>Company | Packaging | $150,000 |
| Stone Container<br>150N Michigan,<br>IL 60673 | Smurfit-Stone<br>Container Corp<br>150 N Michigan Ave,<br>Chicago, IL 60673US | RockTenn<br>Company | Packaging | $200,000 |
| Verizon<br>295 Maple Ave,<br>Basking Ridge NJ | Verizon Business<br>1 Verizon Way, Basking<br>Ridge NJ 07920 US | Verizon<br>Communications | Telecom | $250,000 |
| Verizon<br>WRLS#12RK<br>NJ 7920 USA | Cellco Partnership<br>(Verizon Wireless)<br>1 Verizon Way, Basking<br>Ridge NJ 07920 US | Verizon<br>Communications | Telecom | $50,000 |

FIG. 3

| Match Pass | Description | Status / Confidence |
|---|---|---|
| NADR, NADRH | Name and address | Accept 94+ |
| NCTY1_b, NCTY2_b, NCTY3_b, NCTY1H_b, NCTY2H_b, NCTY3H_b | Name and city, blank address | Accept 95+ |
| NZIP1_b, NZIP2_b, NZIP3_b, NZIP1H_b, NZIP2H_b, NZIP3H_b | Name and postal, blank address | Accept 95+ |
| NCTY1, NCTY2, NCTY3, NCTY1H, NCTY2H, NCTY3H | Name and city | Link 95+ |
| NZIP1, NZIP2, NZIP3, NZIP1H, NZIP2H, NZIP3H | Name and partial postal | Link 95+ |
| NREG1, NREG2, NREG3, NREG1H, NREG2H, NREG3H | Name and region | Link 95+ |
| NISO1, NISO2, NISO3, NISO1H, NISO2H, NISO3H | Name and country | Link 95+ |
| ADR, ADRH | Address | n/a |
| NAM1, NAM2, NAM3, NAM1H, NAM2H, NAM3H | Name | n/a |

FIG. 4

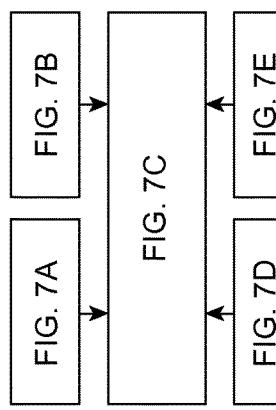

3rd Party Data Provider #1

| DP1_ID | NAME1 | NAME2 | ADDRESS | City | RegFull | Pcode1 |
|---|---|---|---|---|---|---|
| DP1-001 | Comp L | Suppl 1 | 195 Broadway | New York | New York | 10007 |
| DP1-002 | Comp O | Suppl 1 | Broadway | New York | New York | 10007 |
| DP1-003 | Comp L | Suppl 1 | 195 Broadway | New York | New York | 10007 |
| DP1-004 | Comp L | Suppl 1 | 195 Broadway | New York | New York | 10007 |
| DP1-005 | Comp M | Suppl 1 | 195 Broadway | New York | New York | 10007 |
| DP1-006 | Comp F | Suppl 1 | 437 Madison | New York | New York | 10022 |
| DP1-007 | Comp H | Suppl 6 | 135 E 57th St | New York | New York | 10022 |
| DP1-008 | Comp A | Suppl 4 |  | Los Angeles | California | 90074 |
| DP1-009 | Comp A | Suppl 5 | 2765 Loker | Carlsbad | California | 92010 |
| DP1-010 | Comp I | Suppl 4 | 5545 Fermi Ct | Carlsbad | California | 92008 |
| DP1-011 | Comp J | Suppl 4 | 5055 N Greeley | Portland | Oregon | 97217 |
| DP1-012 | Comp P | Suppl 4 | Hoogoorddreef | Amsterdam Zuidoost | Noord-Holland | 1101 |
| DP1-013 | Comp K | Suppl 4 | Adi-Dassler-St | Herzogenaurach | Bayern | 91074 |

FIG. 7A

| Pcode2 | CntryName | FAX | ISOLVL | SMLBUS | BANKRUPTCY_IND |
|---|---|---|---|---|---|
| 3100 | United States | 5867490139 | 9001 | Y | |
| 3100 | United States | 8606532965 | | Y | Y |
| 3100 | United States | 8602241733 | 9001 | Y | |
| 3100 | United States | 6038826925 | 9001 | Y | Y |
| 3100 | United States | 4135256895 | 9001 | Y | |
| 7000 | United States | 8606748679 | 9001 | Y | |
| 2133 | United States | 2126294803 | 9001 | Y | Y |
| | United States | 9783687941 | 9001 | Y | |
| 6601 | United States | 8605857032 | 9001 | Y | Y |
| 7324 | United States | 8602838589 | 9001 | Y | Y |
| 3524 | United States | 8602241733 | 9001 | Y | |
| BA | Netherlands | 6038826925 | 9001 | Y | Y |
| | Germany | 4135256895 | 9001 | Y | |

FIG. 7A (Cont.)

| 3rd Party Data Provider #2 | | | | | | | | | | | |
|---|---|---|---|---|---|---|---|---|---|---|---|
| DP2_ID | NAME1 | NAME2 | ADDRESS | City | RegFull | Pcode1 | Pcode2 | CountryName | R_IN1 | R_IN2 | R_IN3 | R_IN4 |
| DP2-001 | Comp F | Suppl 1 | 437 Madison | New York | New York | 10022 | 7000 | United States | 4 | 1 | 1 | 2 |
| DP2-002 | Comp G | Suppl 2 | 314 W Instit | Chicago | Illinois | 60610 | 7585 | United States | 4 | 1 | 1 | 2 |
| DP2-003 | Comp N | Suppl 6 | 135 E 57th St | New York | New York | 10022 | 2133 | United States | 2 | 2 | 2 | 2 |
| DP2-004 | Comp A | Suppl 4 | 2765 Loker | Carlsbad | California | 92010 | 6601 | United States | 5 | 1 | 2 | 2 |

FIG. 7B

| SOURCE | BEID | SOURCEKEY | NAME1 | NAME2 | ADDRESS |
|---|---|---|---|---|---|
| DP4 | E-33 | DP4-004 | Comp Q | Suppl 7 | 80 Wesley St |
| DP4 | E-49 | DP4-001 | Comp O | Suppl 1 | 195 |
| DP1 | E-51 | DP1-001 | Comp L | Suppl 1 | 195 Broadway |
| DP1 | E-51 | DP1-004 | Comp L | Suppl 1 | 195 Broadway |
| DP3 | E-51 | DP3-001 | Comp L | Suppl 1 | 195 Broadway |
| DP1 | E-51 | DP1-003 | Comp L | Suppl 1 | 195 Broadway |
| DP1 | E-52 | DP1-002 | Comp O | Suppl 1 | Broadway |
| DP1 | E-52 | DP1-005 | Comp M | Suppl 1 | 195 Broadway |
| DP2 | E-70 | DP2-003 | Comp N | Suppl 6 | 135 E 57th St Rear |
| DP1 | E-70 | DP1-007 | Comp H | Suppl 6 | 135 E 57th St Rear |
| DP2 | E-47 | DP2-001 | Comp F | Suppl 1 | 437 Madison Ave |
| DP1 | E-47 | DP1-006 | Comp F | Suppl 1 | 437 Madison Ave |
| DP4 | E-48 | DP4-003 | Comp R | Suppl 8 | 4860 5th Street Hwy |
| DP4 | E-73 | DP4-002 | Comp S | Suppl 9 | 1906 N Rome Ave |
| DP1 | E-31 | DP1-008 | Comp A | Suppl 4 | |
| DP2 | E-41 | DP2-005 | Comp I | Suppl 4 | 5545 Fermi Ct |
| DP1 | E-41 | DP1-010 | Comp I | Suppl 4 | 5545 Fermi Ct |
| DP2 | E-99 | DP2-004 | Comp A | Suppl 4 | 2765 Loker Ave W |
| DP1 | E-99 | DP1-009 | Comp A | Suppl 5 | 2765 Loker Ave W |
| DP1 | E-55 | DP1-011 | Comp J | Suppl 4 | 5055 N Greeley Ave |
| DP1 | E-19 | DP1-013 | Comp K | Suppl 4 | Adi-Dassler-Str1 |
| DP1 | E-49 | DP1-012 | Comp P | Suppl 4 | Hoogoordreef 9A |
| DP3 | E-20 | DP3-003 | Comp T | Suppl 10 | 1 Ville-Marie Pl |
| DP3 | E-15 | DP3-002 | Comp U | Suppl 11 | 15 Pasdaran Rd |
| DP3 | E-80 | DP3-004 | Comp V | Suppl 12 | cll 2 |
| DP2 | E-68 | DP2-002 | Comp W | Suppl 2 | 314 W Institute Pl |

Records from various data providers are grouped under BEID E-51

Grouped under BEID E-70

Grouped under BEID E-47

Grouped under BEID E-41

Grouped under BEID E-99

FIG. 7C

BUSINESS COMPENDIUM

| Street | Premise | SPrefix | SPostfix | SType | City | RegAbbr | RegFull | PCodeFull | Pcode1 |
|---|---|---|---|---|---|---|---|---|---|
| Wesley | 80 | | | St | South Hackensack | NJ | New Jersey | 07606-1510 | 7606 |
| Broadway | 195 | | | | New York | NY | New York | 10007-3100 | 10007 |
| Broadway | 195 | | | | New York | NY | New York | 10007-3100 | 10007 |
| Broadway | 195 | | | | New York | NY | New York | 10007-3100 | 10007 |
| Broadway | 195 | | | | New York | NY | New York | 10007-3100 | 10007 |
| Broadway | 195 | | | | New York | NY | New York | 10007-3100 | 10007 |
| Broadway | | | | | New York | NY | New York | 10007-3100 | 10007 |
| Broadway | 195 | | | | New York | NY | New York | 10007-3100 | 10007 |
| 57th | 135 | E | | St | New York | NY | New York | 10022-2133 | 10022 |
| 57th | 135 | E | | St | New York | NY | New York | 10022-2133 | 10022 |
| Madison | 437 | | | Ave | New York | NY | New York | 10022-7000 | 10022 |
| Madison | 437 | | | Ave | New York | NY | New York | 10022-7000 | 10022 |
| 5th Street | 4860 | | | Hwy | Temple | PA | Pennsylvania | 19560-1406 | 19560 |
| Rome | 1906 | N | | Ave | Tampa | FL | Florida | 33607-4424 | 33607 |
| | | | | | Los Angeles | CA | California | 90074 | 90074 |
| Fermi | 5545 | | | Ct | Carlsbad | CA | California | 92008-7324 | 92008 |
| Fermi | 5545 | | | Ct | Carlsbad | CA | California | 92008-7324 | 92008 |
| Loker | 2765 | | W | Ave | Carlsbad | CA | California | 92010-6601 | 92010 |
| Loker | 2765 | | W | Ave | Carlsbad | CA | California | 92010-6601 | 92010 |
| Greeley | 5055 | N | | Ave | Portland | OR | Oregon | 97217-3524 | 97217 |
| Adi-Dassler | 1 | | | Str | Herzogenaurach | BY | Bayern | 91074 | 91074 |
| Hoogoorddreef | 9A | | | | Amsterdam Zuidoost | N H | Noord-Holland | 1101 BA | 1101 |
| Ville-Marie | 1 | 3431 | | Pl | Montréal | QC | Quebec | H3B 3N6 | H3B |
| Pasdaran | 15 | | | Rd | Tehran | Tehra | Tehran | 11369 | 11369 |
| 2 | | | | cll | Tijuana | BC | Baja California | 22000 | 22000 |
| Institute | 314 | W | | Pl | Chicago | IL | Illinois | 60610-7585 | 60610 |

FIG. 7C (Cont. 1)

| Pcode2 | CountryName | CntryCode | EntChangeTime | DeleteFlag |
|---|---|---|---|---|
| 1510 | United States | US | 40726.27285 | 0 |
| 3100 | United States | US | 40129.56651 | 0 |
| 3100 | United States | US | 40129.56651 | 1 |
| 3100 | United States | US | 40129.56651 | 0 |
| 3100 | United States | US | 40129.56651 | 0 |
| 3100 | United States | US | 40129.56651 | 0 |
| 3100 | United States | US | 40129.56651 | 0 |
| 3100 | United States | US | 40129.56651 | 0 |
| 2133 | United States | US | 40731.80195 | 0 |
| 2133 | United States | US | 40129.56651 | 0 |
| 7000 | United States | US | 40731.80195 | 0 |
| 7000 | United States | US | 40129.56651 | 0 |
| 1406 | United States | US | 40726.27285 | 0 |
| 4424 | United States | US | 40726.27285 | 0 |
|  | United States | US | 40129.56651 | 0 |
| 7324 | United States | US | 40731.80195 | 0 |
| 7324 | United States | US | 40129.56651 | 0 |
| 6601 | United States | US | 40731.80195 | 0 |
| 6601 | United States | US | 40129.56651 | 0 |
| 3524 | United States | US | 40129.56651 | 0 |
|  | Germany | DE | 40129.56651 | 0 |
| BA | Netherlands | NL | 40129.56651 | 0 |
| 3N6 | Canada | CA | 40726.16763 | 0 |
|  | Islamic Rep. of Iran | IR | 40726.16763 | 0 |
|  | Maxico | MX | 40726.16763 | 0 |
| 7585 | United States | US | 40731.80195 | 0 |

FIG. 7C (Cont. 2)

| 3rd Party Data Provider #3 | | | | | | |
|---|---|---|---|---|---|---|
| DP3_Key | NAME1 | NAME2 | ADDRESS | City | RegionFull | Pcode1 |
| DP3 – 001 | Comp L | Suppl 1 | 195 Broadway | New York | New York | 10007 |
| DP3 – 002 | Comp U | Suppl 13 | 15 Pasdaran Rd | Tehran | Tehran | 11369 |
| DP3 – 003 | Comp T | Suppl 10 | 1 Ville-Marie Pl Suite 3431 | Montréal | Quebec | H3B |
| DP3 – 004 | Comp V | Suppl 12 | cll 2 | Tijuana | Baja California | 22000 |

FIG. 7D

| 3rd Party Data Provider #4 | | | | | | | |
|---|---|---|---|---|---|---|---|
| DP4_ID | NAME1 | NAME2 | ADDRESS | City | RegionFull | Pcode1 | Pcode2 |
| DP4 – 001 | Comp O | Suppl 1 | 195 | New York | New York | 10007 | 3100 |
| DP4 – 002 | Comp S | Suppl 14 | 1906 N Rome | Tampa | Florida | 33607 | 4424 |
| DP4 – 003 | Comp R | Suppl 8 | 4860 5th St. | Temple | Pennsylvania | 19560 | 1406 |
| DP4 – 004 | Comp Q | Suppl 7 | 80 Wesley St. | South Hackensack | New Jersey | 7606 | 1510 |

FIG. 7E

| Pcode2 | CountryName | PROGRAM | SDN_NAME | SDN_TYPE | ALT_TYPE |
|---|---|---|---|---|---|
| 3100 | United States | SDT | ABASTECEDORA NAVAL | | aka |
| | Islamic Republic of Iran | BELARUS | ABDELNUR, N. | individual | lis |
| 3N6 | Canada | SDNT | ACECHILLY | vessel | kas |
| | Mexico | DARFUR | ACEFROSTY | vessel | uis |

FIG. 7D (Cont.)

| CountryName | SIC8 | MINOR | VETE | WMND |
|---|---|---|---|---|
| United States | 8221 | | | |
| United States | 3812 | ASN | Y | |
| United States | 3829 | BLK | Y | |
| United States | 1094 | CNA | | Y |

FIG. 7E (Cont.)

DATA ENRICHMENT USING BUSINESS COMPENDIUM

BACKGROUND

Embodiments of the present invention relate to data warehouses, and in particular, to systems and methods employing data enrichment using a business compendium.

Unless otherwise indicated herein, the approaches described in this section are not prior art to the claims in this application and are not admitted to be prior art by inclusion in this section.

Effective resource planning for the enterprise may depend upon the accuracy and detail of underlying records. For example, where supplier identities are obscured due to poor data quality and/or lack of content in a data warehouse, the depth of understanding of a supply base may be hindered. This lack of visibility may interfere with rightful insight on supplier information, and aggregated spend towards those suppliers.

Accordingly, the present disclosure addresses these and other issues with systems and methods employing data enrichment using a business compendium.

SUMMARY

Embodiments relate to enrichment of a data warehouse utilizing a business compendium. Embodiments may employ a process comprising data standardization and cleansing, de-duplication of entries, and matching and enrichment, followed by manual review of an enriched record by a user. During standardization, data may be transformed into consistent content, placing correct data elements into appropriate fields, removing invalid characters, and/or standardizing names and addresses. Duplicate records are then detected and marked. During matching and enrichment, the existence of an entity (such as a supplier), may be verified by progressive matching against the business compendium. Enrichment may provide additional information regarding the entity (e.g. related to risk, diversity, and bankruptcy). The enriched record is then available for manual review, allowing the user of the data warehouse to change duplicates, matches, and parent/child linkages. Feedback from the user review may enhance the accuracy of subsequent enrichment. The business compendium may be constructed from multiple data providers after matching suppliers on various attributes.

An embodiment of a computer-implemented method comprises causing an enrichment engine to receive an input data set, causing the enrichment engine to perform standardization and cleansing of the input data set, and causing the enrichment engine to identify duplicate entries in the input data set. A matching component of the enrichment engine is caused to perform matching of non-duplicate entries of the input data set to a business compendium having data compiled from a third party source. The enrichment engine is caused to create an enriched data set including additional information based upon the matching, and the enriched data set is provided to a user for manual review.

An embodiment of a non-transitory computer readable storage medium embodies a computer program for performing a method comprising causing an enrichment engine to receive an input data set, causing the enrichment engine to perform standardization and cleansing of the input data set, and causing the enrichment engine to identify duplicate entries in the input data set. A matching component of the enrichment engine is caused to perform matching of non-duplicate entries of the input data set to a business compendium having data compiled from a third party source. The enrichment engine is caused to create an enriched data set including additional information based upon the matching, and the enriched data set is provided to a user for manual review.

An embodiment of a computer system comprises one or more processors and a software program executable on said computer system. The software program is configured to cause an enrichment engine to receive an input data set, cause the enrichment engine to perform standardization and cleansing of the input data set, and cause the enrichment engine to identify duplicate entries in the input data set. A matching component of the enrichment engine is caused to perform matching of non-duplicate entries of the input data set to a business compendium having data compiled from a third party source. The enrichment engine is caused to create an enriched data set including additional information based upon the matching. The enriched data set is provided to a user for manual review.

Certain embodiments may further comprise providing feedback to the matching component based upon the manual review.

In some embodiments the input data set includes a business entity, and the additional information includes ownership of the business entity.

According to particular embodiments, the additional information comprises diversity information, government sanction information, bankruptcy information, or risk information.

In various embodiments the matching is based upon multiple priorities.

In certain embodiments the matching is performed progressively according to loosening criteria.

According to some embodiments the business compendium is created from a plurality of content providers.

The following detailed description and accompanying drawings provide a better understanding of the nature and advantages of particular embodiments.

BRIEF DESCRIPTION OF THE DRAWINGS

FIG. 3 is a table showing an example of an enriched data set in tabular form.

FIG. 4 shows matching rules employed by an enrichment engine.

FIGS. 7-7E show the creation of a business compendium.

DETAILED DESCRIPTION

Described herein are techniques for data enrichment. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Data enrichment is the processing of normalizing the supply base and supplementing it with additional information to improve leverage and decision making. As just one example, enriched business information can drives effective spend analyses for leverage, compliance, supplier management, and business insights.

According to particular embodiments, data from a customer can be enriched with additional information obtained from a business compendium. Such a business compendium may comprise information such as corporate ownerships, trade styles, line-of-business, diversity indicators, and government sanctions. In particular embodiments, the business compendium can provide consolidated views of supplier data from multiple third party data providers, and other additional supplier-related information.

Figure 1A:
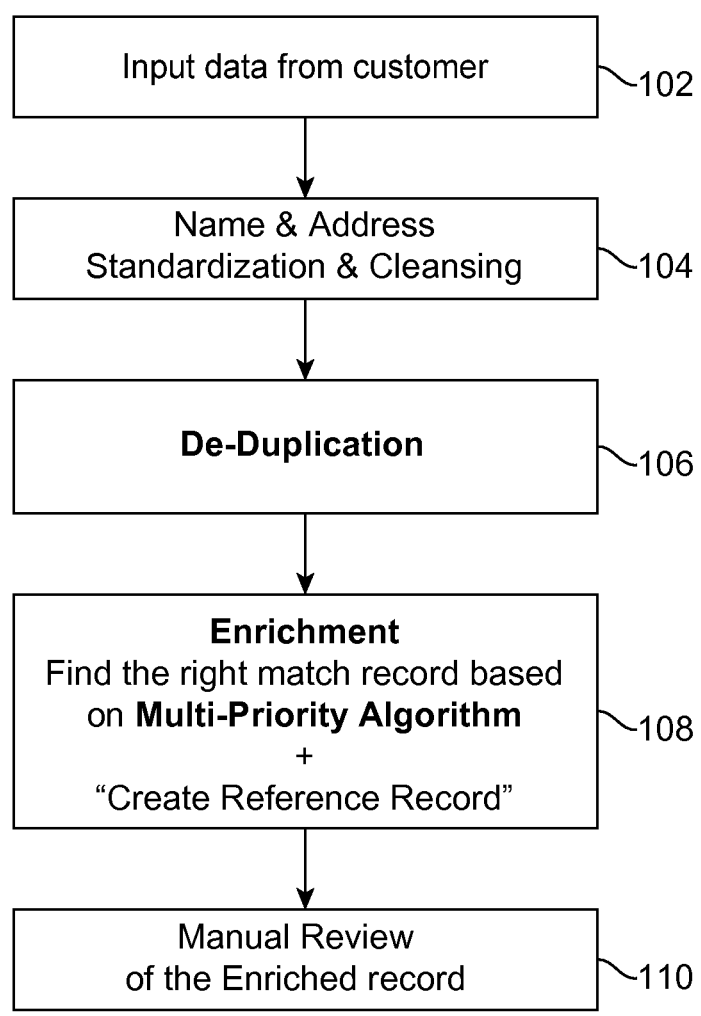
FIG. 1A is a simplified flow diagram showing a data enrichment process according to an embodiment.

FIG. 1A is a simplified flow diagram showing an embodiment of a data enrichment process 100. In a first step 102, an input data set is received from a customer. FIG. 2A presents an example input data set in table form.

In step 104, the input data is subject to standardization and cleansing of the name and address information. FIG. 2B shows standardization and cleansing of the example data set of FIG. 2A.

In step 106, duplicate records are identified and marked. FIG. 2C shows the performance of this function on the example data set.

In step 108, the data is matched with records of a business compendium to perform validation and creation of an enriched data set. The matching may be performed utilizing a multi-step match algorithm. The enrichment may create reference records reflecting the most substantially enriched information available from the business compendium and third party data providers.

FIG. 2D shows enrichment of the exemplary data set. FIG. 2E shows the business compendium referenced in the enrichment, and also the third party data providers that are in communication with the business compendium.

In step 110, the enriched records may be presented to a user for manual review. FIG. 2F shows the manual review of the exemplary data set.

Depending upon the particular embodiment, one or more steps may be omitted and/or performed in a different order than is outlined above. Details regarding various embodiments are presented below.

Figure 1B:
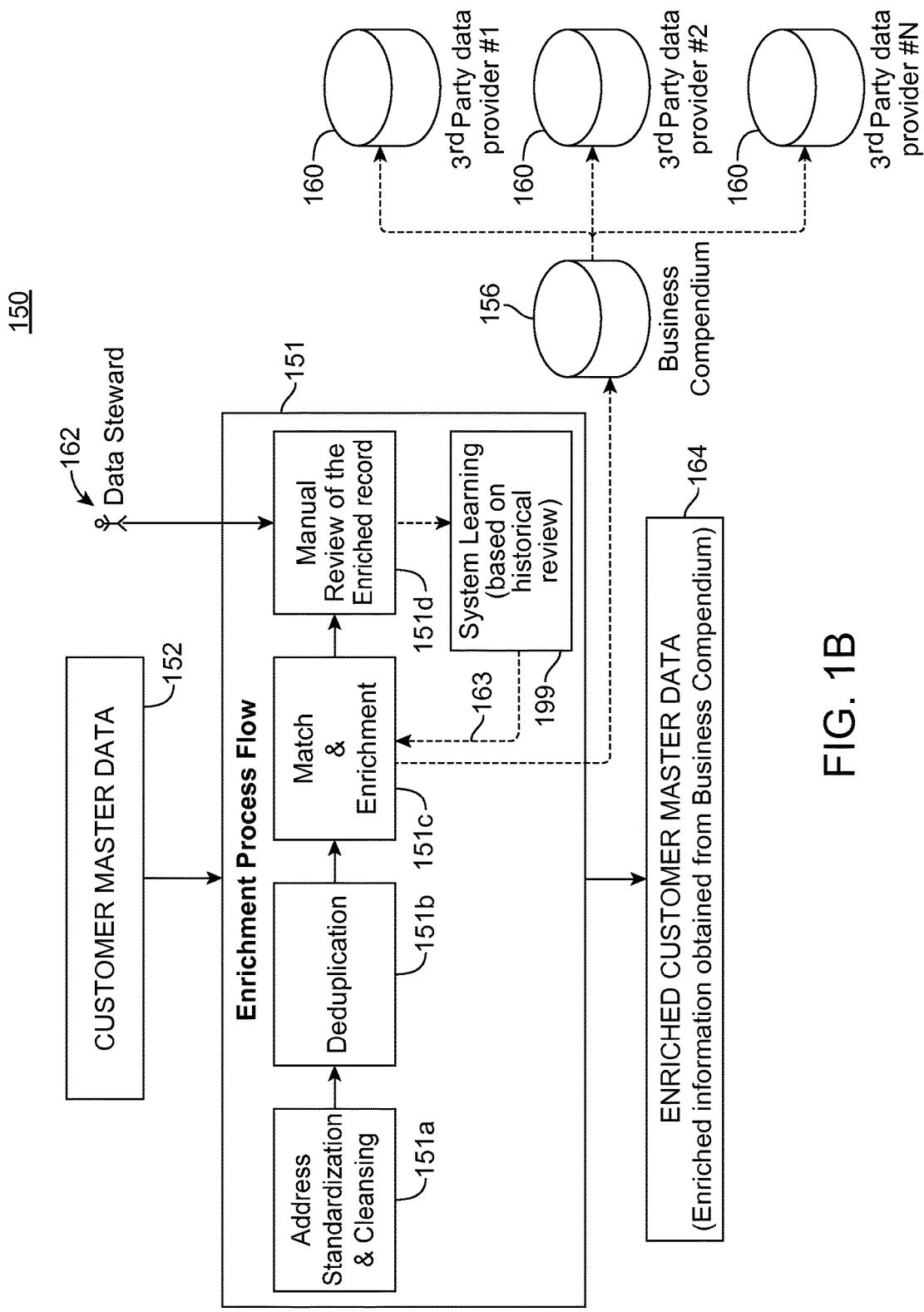
FIG. 1B is a simplified diagram showing a system for data enrichment according to an embodiment.

FIG. 1B is a simplified diagram showing a system 150 for data enrichment according to an embodiment. This figure depicts how the customer data flows through various sections of enrichment process and gets additional enriched information from the business compendium 156.

In particular, FIG. 1B shows an enrichment engine 151 receiving the input data set 152 from a customer. The input data set may comprise customer or supplier master data.

The enrichment engine references a plurality of rules present in a non-transitory computer readable storage medium in order to perform one or more of the steps outlined above in FIG. 1A and described in detail below. The enrichment engine includes a standardization and cleansing component 151a, and a de-duplication component 151b.

A matching and enrichment component 150c of the enrichment engine is configured to communicate with a business compendium 156. Business compendium 156 in turn includes data from one or more third party data providers 160.

A review component 151d of the enrichment engine is configured to afford a user 162 the opportunity for manual review and revision of data through feedback 163. Ultimately, the enrichment engine provides an enriched output data set 164.

Functions performed by the various components of the data enrichment engine that may be present in various embodiments, are now described in detail.

During standardization, the input data is transformed into clean and consistent content. For example, the input data may be stored in the wrong fields, may have inconsistent spellings and abbreviations, and/or may carry invalid characters. The standardization functionality places the correct data elements into the appropriate fields, removes invalid characters, and/or standardizes firm names and addresses.

Examples of standardization include but are not limited to:
Column parsing;
Firm names, e.g. {I.B.M., INT'L BUS. MACH}=IBM;
Legal entity designations by country, e.g. {LLC, PTY, PNTY, LIMITED, CO, CORP . . . };
Abbreviations—common words and phrases, e.g. {MFG, INTL, SVCS, M&R};
Word forms, e.g. {MANUFACTURE, MANUFACTURING};
Data Services Global Address Cleansing with the All World Directory;
Validation of addresses to the locality/city level; and
Formatting and parsing street level components.

Following standardization, duplicate records are identified within the data submitted. Such duplicates may arise from spelling variations or the use of different system keys. The duplicate records are detected and marked. Duplicate records are not sent further for enrichment.

During the enrichment, suppliers are matched against the business compendium in multiple ways to verify their existence. Certain embodiments may start with the tightest, most detailed criteria calling for close location matches. Subsequent matching may become progressively looser (e.g. in terms of geography or other factors), in order to accurately link the supplier with the appropriate record in the business compendium.

According to certain embodiments, a matching process may consider various combinations of:
Names (Legal, Trade style, DBA)
Addresses (Street, Alternate Mailing Address)
Geographic Ranges (Postal, City, Region, Country, ISO code)
for exact and fuzzy matching FIG. 4 shows sample passes of above match process.

Matching of an entry in a data set with a record of a business compendium, may be achieved through matching performed by a matching engine. According to certain embodiments, where multiple matched records are found, the matching process may employ a Multi-Priority matching algorithm comprising a set of rules applied in order to choose among them.

In a particular embodiment, the highest priority (Priority 1) rule chooses the record(s) having a match score≥a minimum limit for NAME OR ADDRESS that were changed manually by the user in the past. A next-highest priority (Priority 2) rule chooses the records(s) having a match score≥a minimum limit for NAME OR ADDRESS that were generated by matching engine.

A next-highest priority (Priority 3) rule of the algorithm determines if multiple records are still found. If so, records with a preferred data provider are chosen.

After application of the Priority 3 rule there may remain a tie in the score, with multiple records still found. Then, a next-highest priority (Priority 4) rule of the algorithm chooses the record which is the most recently updated one.

Once the record has been matched and validated, it may be further processed and enriched with additional information. Examples of such additional information include but are not limited to risk information, diversity information, government sanction, bankruptcy information, ownership information, line of business information, sales review, number of employees, headquarter etc.

The business compendium and/or satellite database(s) store additional information. The enriched information is consolidated from the business compendium and/or satellite tables, and added to customer record and then declared as a reference record.

A "reference record" is a customer record that is formed with significant content extracted from the various sources according to source priority, element priority, and pre-defined rules. The content is extracted from the business compendium and/or satellite tables for enrichment.

Embodiments provide for manual review of enriched records by the user. The user can review and change duplicates, matches, and parent/child linkages after creation of the reference record.

The oversight review may generally be done after sources are enriched, in order to make sure orphan records are managed and linkages are appropriate. Depending upon the scope of the customer's requirements, this could be done as a formal external review in conjunction with a Data Steward of the user in order to ensure overall quality. From an implementation standpoint, it may be appropriate to conduct the oversight review internally first, and then involve a Data Steward.

Rejected matches may be logged so as not to repeat the same suggestion in the future. Thus, particular embodiments may employ these self-learning aspects, reducing over time a need for manual review. This aspect of system learning is shown as 199 in FIG. 1B.

According to some embodiments, highly confident matches may automatically be accepted. The remaining matches may require some resolution. In certain embodiments, priority logic may be applied to resolve the remaining matches. For example the "Multi-Priority" algorithm described above offers a set of rules applied to multiple records found after matching, in order to choose the best among them.

As new external source data is introduced into the process, it may go through the same standardization and cleansing, duplication, matching and prioritization logic before updating the business compendium. This will ensures that both sets of data are cleaned same before matching to maximize the quality and quantity of the match.

EXAMPLE

Figure 2:
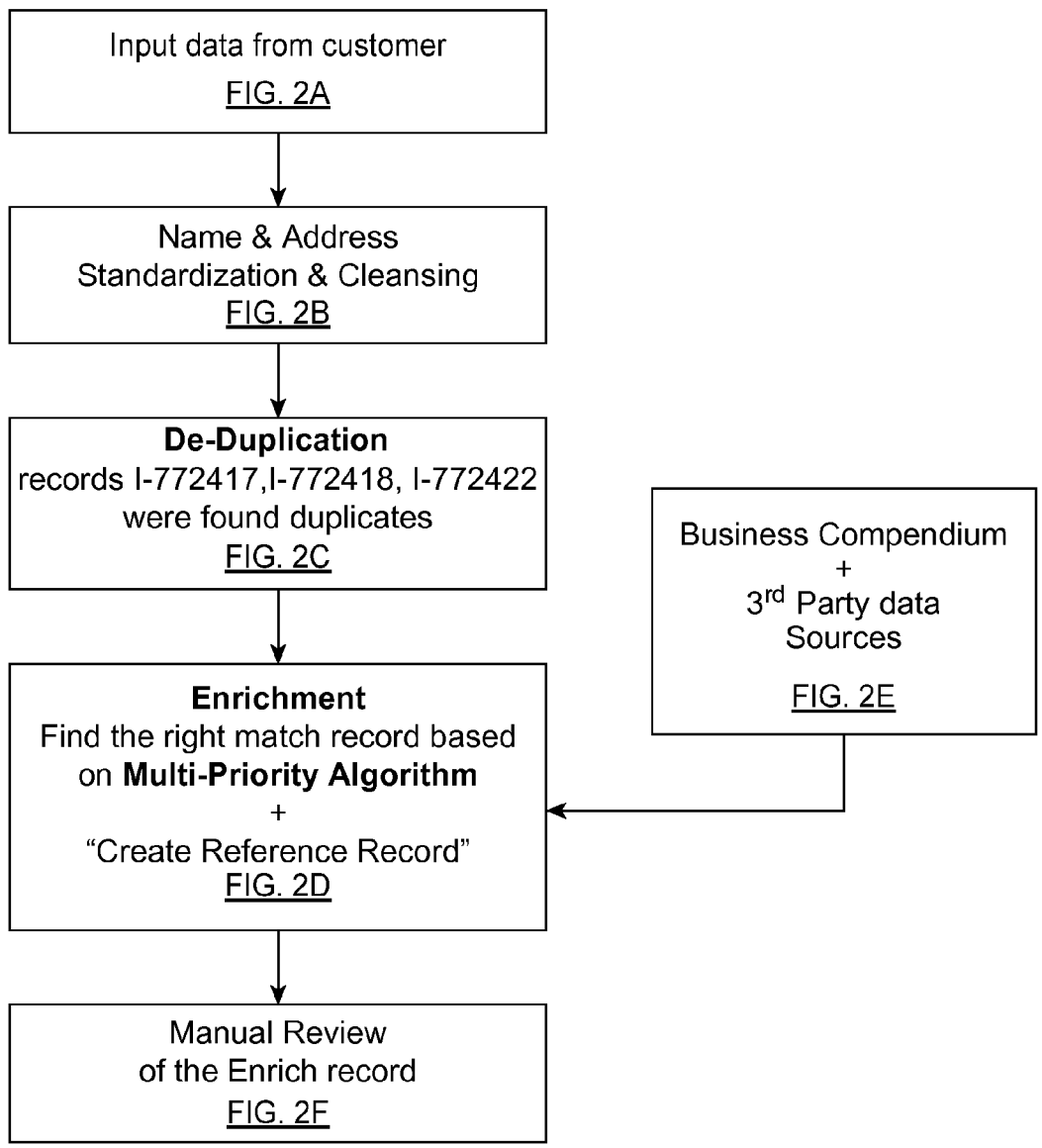
FIGS. 2-2F are diagrams showing an example of an enrichment process.
Figure 2E:
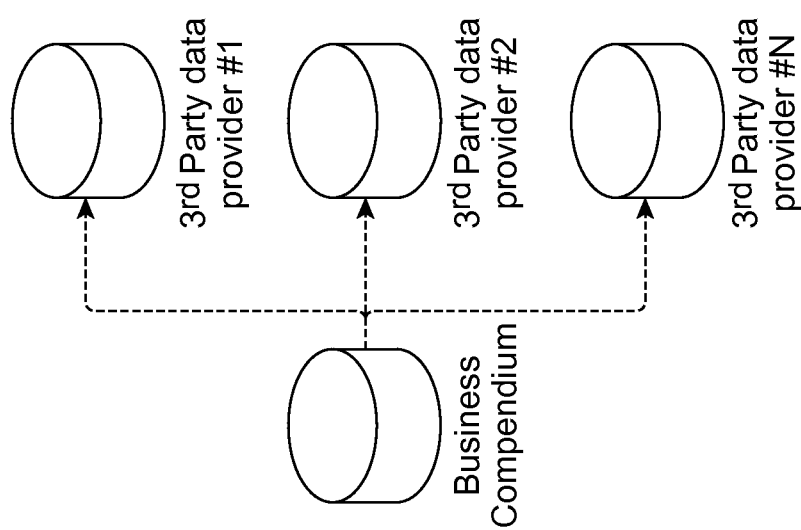

FIGS. 2-2F are simplified diagrams showing an example of a process according to an embodiment. FIG. 2 shows an overview of the process.

FIG. 2A provides the raw data from the input. Missing city information for record I-772418 is filled in after cleansing process in FIG. 2B. The nine digit zip code is filled in for the records I-772416, I-772417, I-772418, and I-772422 in FIG. 2B.

In FIG. 2C, the records I-772417, I-772418 and I-772422 are duplicated, and they have the same duplicate ID I-772417. Records I-772412, I-772416, I-772417 and I-772419 will move forward to FIG. 2D for Enrichment.

After matching with the business compendium, the record I-772412 gets the hierarchy of I-772412→E51→E52→E47. Also, the record I-772412 gets enrichment information such as TIN, LOBDESC, ISO, and Minority indicator, Veteran indicator, Women owned indicator, small business indicator, OFAC code, Risk information etc.

In FIG. 2F, following the manual review, the parent of I-772416 is changed from E68 to E52.

The SAP Business Compendium is a dynamic business record constructed from contextually relevant data compiled from around the globe. While new sources are negotiated on an ongoing basis, a current version of the SAP Business Compendium includes over 175 million businesses in more than 200 countries.

The SAP Business Compendium supplier hierarchy is a multi-level hierarchy based on legal ownership—51% or more owned. The hierarchy is created by using information stored in satellite databases from third party sources, examples of which include but are not limited to Dunn & Bradstreet (DNB), Central Contract Registration (CCR), Office of Foreign Asset Control (OFAC), Cortera etc.

This instant example shows that by enriching customer supplier data with information from the SAP Business Compendium, can lead to greater insight in spend activities. Specifically, FIG. 3 is a table showing a supplier data enriched with supplier location and supplier ownership information from the SAP Business Compendium.

Figure 5:
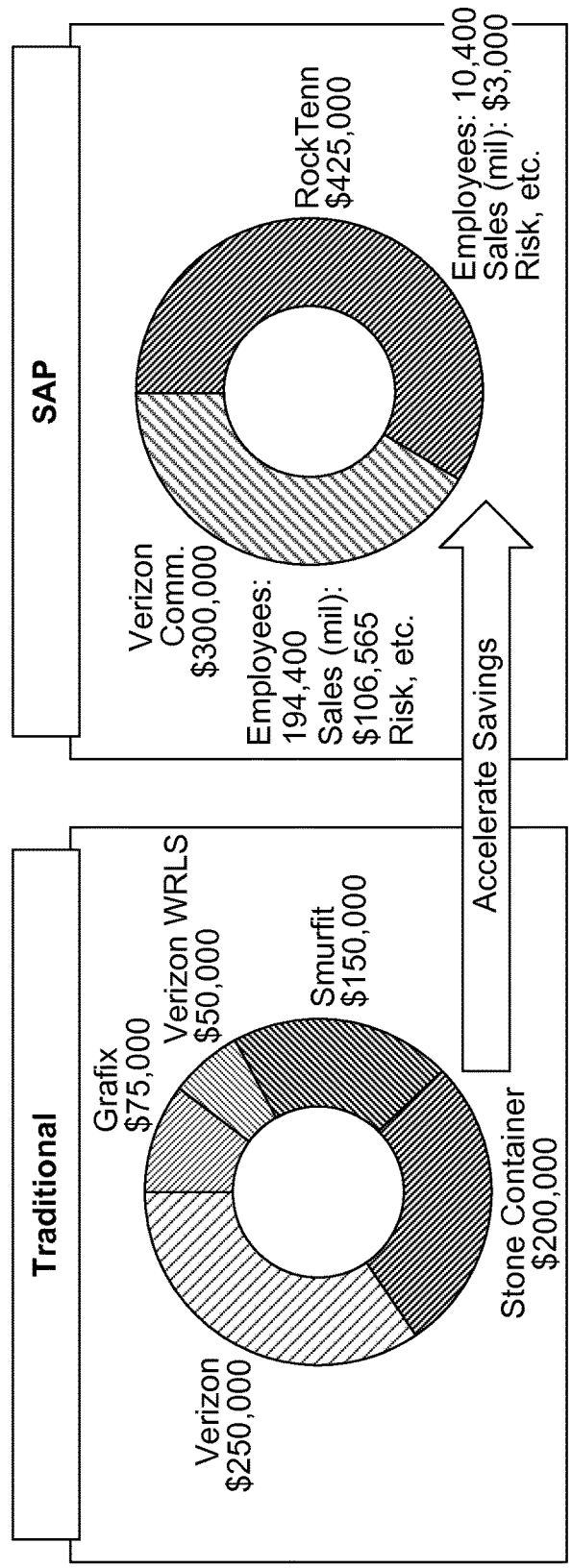
FIG. 5 are charts comparing spend information derived from conventional data, versus spend information obtained from data enriched according to an embodiment.

FIG. 5 shows the charts of the data in FIG. 3. The validation and enrichment process according to an embodiment has allowed customers to achieve reduction in supply base. Specifically, validation of the enriched data set has identified unique supplier locations (e.g. 1 Verizon Way Basking Ridge N.J.; 150 N. Michigan Ave., Chicago, Ill.). Enrichment has also identified supplier locations that are actually subsidiaries of a parent corporation (e.g. RockTenn Company), thereby further reducing the supply base.

Thus by enriching the supplier data set with additional information regarding corporate ownership information, spend can be further aggregated to increase leverage opportunities. Enriching the data set with additional information such as credit, risk, financial status, and government sanctions, may allow identification of scalable and sustainable suppliers to manage risks that can impact supply chain and corporate performance.

By enriching a supplier data set with additional information relating to diversity, reports on compliance for small and minority-owned business targets can be readily prepared. By enriching a supplier data set with additional information relating to government sanctions, reports on compliance with import/export regulations can be readily prepared.

Figure 6:
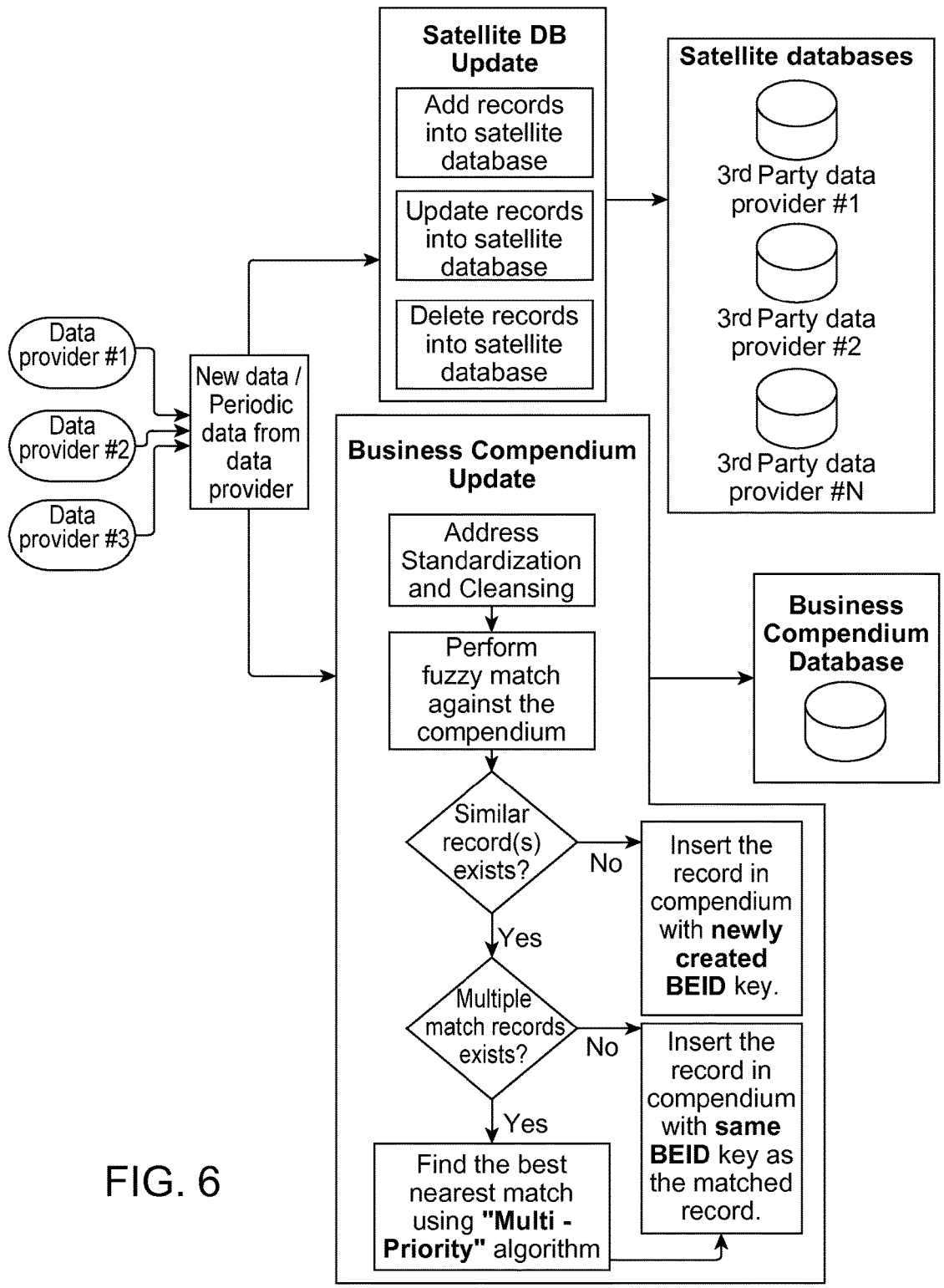
FIG. 6 is a simplified flow diagram showing construction of a business compendium.

Details regarding the SAP Business Compendium and its creation, are provided further below. In particular, FIG. 6 is a simplified flow diagram showing construction of a business compendium.

Different data providers provide the update on regular bases. Satellite databases are updated depending on if the ID of a record is new, old, or deleted.

Each content provider's records may go through same standardization and cleansing, duplication, matching and prioritization logic, before updating the business compendium. For a supplier record never seen before, a new Compendium ID (BEID) is generated.

For the supplier record seen before (even from different source) compendium ID (BEID) is reused. In particular, FIG. 6 shows that the Multi-Priority matching algorithm may also be applicable to the process of updating the business compendium with new source information.

FIG. 7 describes how a business compendium (FIG. 7C) is constructed from four different content providers DP1 (FIG. 7A), DP2 (FIG. 7B), DP3 (FIG. 7D) and DP4 (FIG. 7E). In FIG. 7C, BEID 51 has four (4) records and two different data source providers (DP1, DP3). All four records have similar name and address information for the compendium to have a same BEID.

Similarly BEID E-70 has two records: one from source DP1 (DP1-007), and one from source DP2 (DP2-003). Both of the records have similar name and address elements for compendium to assign the same BEID.

Particular embodiments may offer certain benefits in the context of enterprise resource planning. For example, enriched business information drives effective spend analyses for leverage, compliance, supplier management, and business insights. By enriching suppliers with corporate ownerships, spend can be further aggregated to increase leverage opportunities.

Also, further including information (such as credit, risk, diversity, government sanctions, and financial status) in the data warehouse, allows identification of scalable and sustainable suppliers in order to manage risks that may impact supply chain and corporate performance.

Inclusion of diversity information can facilitate reporting on compliance for small and minority-owned business targets.

Figure 8:
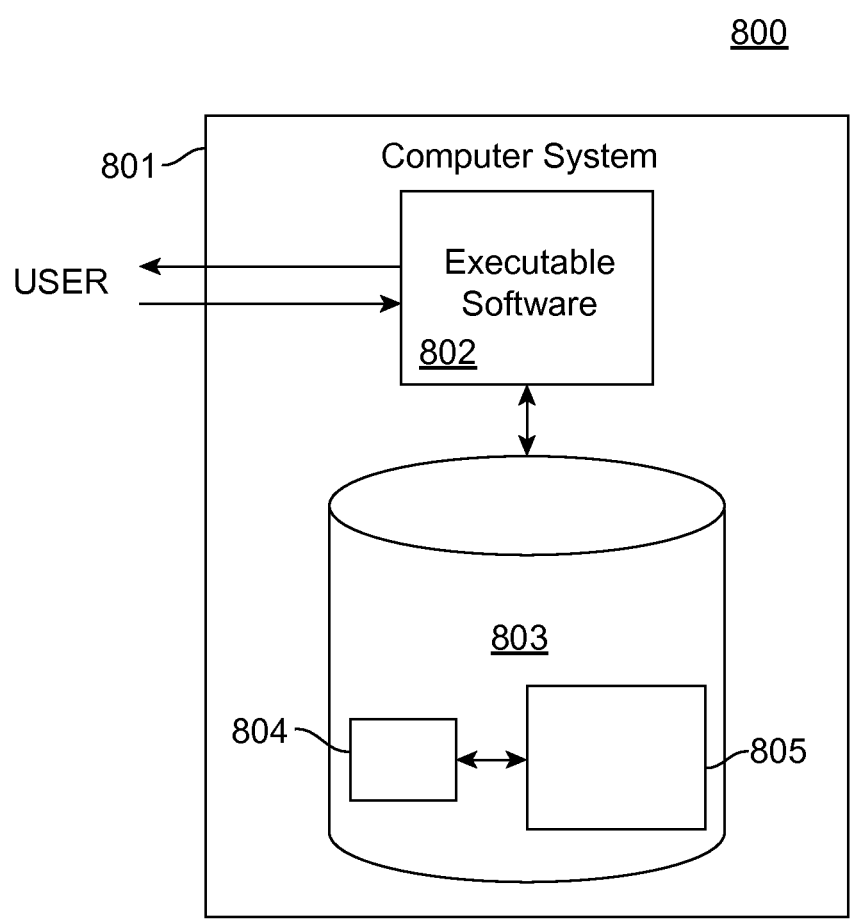
FIG. 8 illustrates hardware of a special purpose computing machine configured to perform transaction classification according to an embodiment.

FIG. 8 illustrates hardware of a special purpose computing machine configured to perform data enrichment according to an embodiment. In particular, computer system 800 comprises a processor 802 that is in electronic communication with a non-transitory computer-readable storage medium 803. This computer-readable storage medium has stored thereon code 805 corresponding to various components of an enrichment engine. Code 804 corresponds to a matching component of the enrichment engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 9:
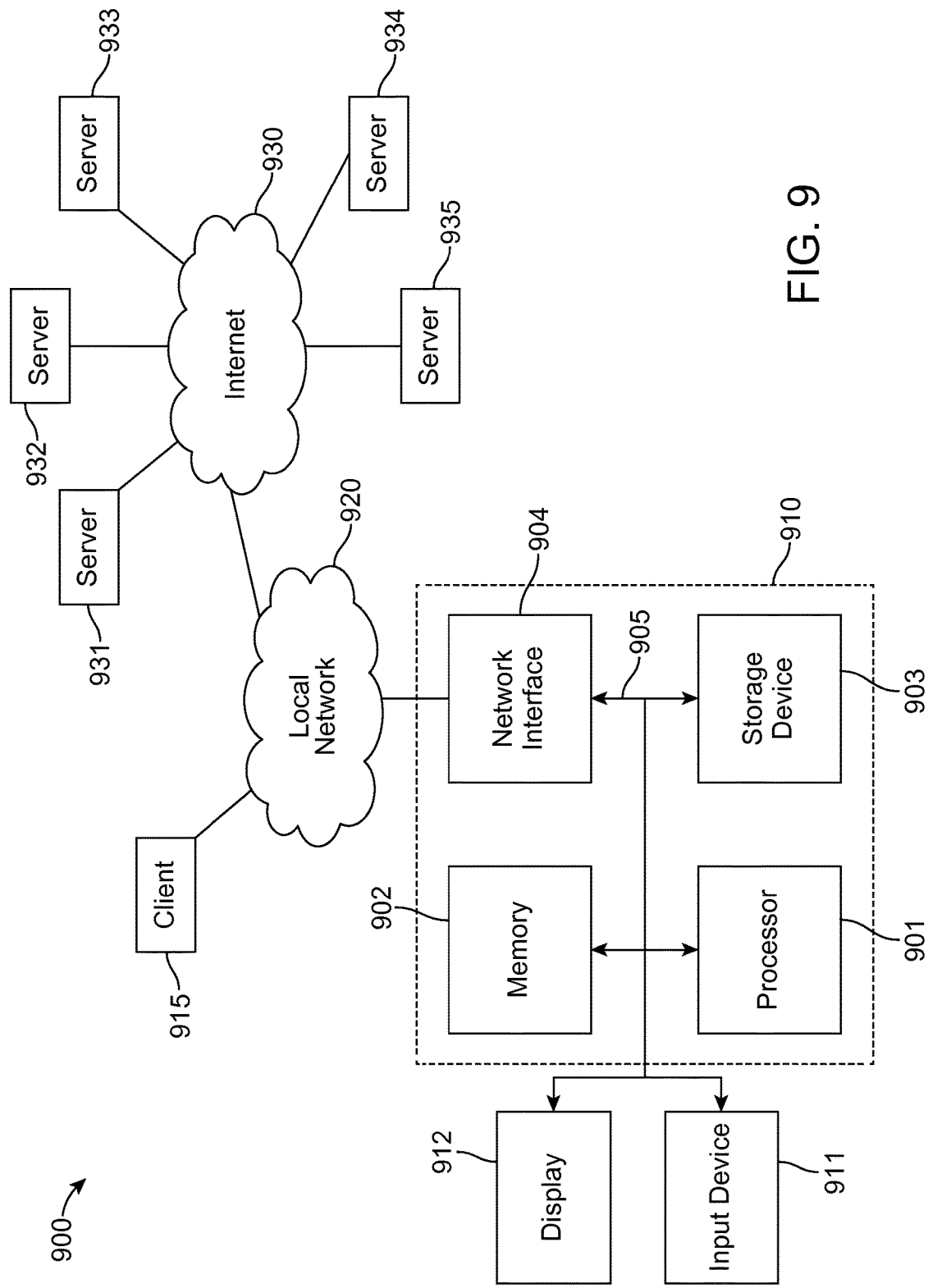
FIG. 9 illustrates an example of a computer system.

An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer system comprising:
one or more processors;
a software program, executable on said computer system, the software program configured to:
cause an enrichment engine to receive an input data set comprising a first supplier and a second supplier;
cause the enrichment engine to perform standardization and cleansing of the input data set, the standardization comprising validating supplier addresses to a locality/city level;
cause the enrichment engine to identify duplicate entries in the input data set;
cause a matching component of the enrichment engine to perform matching of non-duplicate entries of the input data set to a business compendium having data compiled from a third party source, wherein the matching is performed according to criteria comprising,
a first priority comprising name or address having a score greater than a minimum and changed manually in the past,
a second priority comprising name or address having the score greater than the minimum and generated by a matching engine,
a third priority comprising the third party source as a preferred data provider, and
a fourth priority comprising a most recent updating;
cause the enrichment engine to create an enriched data set including additional information based upon the matching, wherein the additional information comprises common corporate ownership and a unique supplier location indicating the first supplier as a subsidiary of the second supplier; and
providing the enriched data set to a user for manual review.

2. A computer system as in claim 1 wherein the computer program is further configured to provide feedback to the matching component based upon the manual review.

3. A computer system as in claim 1 wherein the additional information further comprises diversity information, government sanction information, bankruptcy information, or risk information.

4. A computer system as in claim 1 further comprising logging the enriched data set with a rejection of a match during the manual review.

5. A computer system as in claim 4 wherein the logging precludes including the additional information in the enriched data set in the future.

6. A computer system as in claim 1 wherein the additional information includes a duplicate data record identifier.

7. A computer system as in claim 1 wherein the additional information includes a parent identifier of a hierarchy.

8. A computer system as in claim 7 wherein the parent identifier comprises a compendium identifier in the business compendium.

* * * * *